(12) United States Patent
Soryal et al.

(10) Patent No.: US 11,783,300 B2
(45) Date of Patent: Oct. 10, 2023

(54) TASK EXECUTION ENGINE AND SYSTEM

(71) Applicant: AT&T Intellectual Property I, L.P., Atlanta, GA (US)

(72) Inventors: Joseph Soryal, Ridgewood, NY (US); Naila Jaoude, Eatontown, NJ (US); Cristina Serban, Middletown, NJ (US); Lalita V. Rao, Alexandria, VA (US); Tony Hansen, South Amboy, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 318 days.

(21) Appl. No.: 16/232,983

(22) Filed: Dec. 26, 2018

(65) Prior Publication Data

US 2020/0210960 A1    Jul. 2, 2020

(51) Int. Cl.
| | |
|---|---|
| *G06Q 10/10* | (2023.01) |
| *G06Q 10/1093* | (2023.01) |
| *G06N 20/00* | (2019.01) |
| *G06Q 50/30* | (2012.01) |

(52) U.S. Cl.
CPC ......... *G06Q 10/1097* (2013.01); *G06N 20/00* (2019.01); *G06Q 50/30* (2013.01)

(58) Field of Classification Search
None
See application file for complete search history.

(56) References Cited

U.S. PATENT DOCUMENTS

| | | |
|---|---|---|
| 8,630,741 B1 | 1/2014 | Matsuoka et al. |
| 2014/0317029 A1 | 10/2014 | Matsuoka et al. |
| 2015/0074582 A1 | 3/2015 | Shearer |
| 2015/0338852 A1* | 11/2015 | Ramanujam ........... G08G 1/202 701/2 |
| 2017/0287038 A1* | 10/2017 | Krasadakis ........ G06Q 30/0201 |
| 2018/0046609 A1* | 2/2018 | Agarwal .................... G06F 8/38 |
| 2018/0096568 A1 | 4/2018 | Cohn et al. |
| 2018/0109399 A1* | 4/2018 | Cardoso de Moura ...................... H04W 28/14 |
| 2018/0150798 A1* | 5/2018 | Wilkinson ......... G06Q 10/0838 |
| 2018/0322775 A1* | 11/2018 | Chase ..................... G06N 5/003 |
| 2019/0025817 A1* | 1/2019 | Mattingly ............. H04L 9/0825 |
| 2019/0114078 A1* | 4/2019 | Oh ......................... G06F 3/0604 |
| 2019/0228375 A1* | 7/2019 | Laury .................. G05D 1/0088 |
| 2019/0340546 A1* | 11/2019 | Goldman-Shenhar ...................... G01C 21/3423 |
| 2019/0383621 A1* | 12/2019 | Isaacs ................ G06Q 30/0282 |
| 2020/0050997 A1* | 2/2020 | Fox ........................ G06F 18/214 |

(Continued)

FOREIGN PATENT DOCUMENTS

| | | |
|---|---|---|
| CN | 108052053 A | 5/2018 |
| CN | 108196469 A | 6/2018 |

(Continued)

*Primary Examiner* — Jamie H Austin

(57) ABSTRACT

Methods are disclosed for optimizing execution of tasks for users. A processing system including a processor detects a triggering condition for a transport task for transporting a subject from a first location to a second location via usage of an autonomous vehicle, establishes a negotiated task coordination plan between a user and a third party provider for performing the transport task, and executes the negotiated task coordination plan, wherein the executing causes the autonomous vehicle to travel between the first location and the second location for transporting the subject.

20 Claims, 5 Drawing Sheets

(56) References Cited

U.S. PATENT DOCUMENTS

2020/0168094 A1\* 5/2020 Shimodaira ....... B60W 50/0098
2020/0175392 A1\* 6/2020 Tang .................... G06N 3/0445

FOREIGN PATENT DOCUMENTS

| GB | 2352063 A | 1/2001 |
|---|---|---|
| WO | 2017162171 A1 | 9/2017 |

\* cited by examiner

TASK EXECUTION ENGINE AND SYSTEM

The present disclosure relates generally to a task execution service engine and system, and more particularly to methods, computer-readable media, and processing systems for using machine learning in a platform for optimizing execution of tasks for users.

BACKGROUND

Given the busy schedules of modern life, people must run numerous errands on any given day. In fact, many of these errands are repetitive and have well defined parameters, e.g., predefined timing parameter, predefined location parameter, and the like. As such, without any assistance people are often left to their own devices to continually run these errands without any relief in sight.

SUMMARY

In one example, the present disclosure describes a method, computer readable medium, and processing system for optimizing execution of tasks for users. For example, a processing system including at least one processor detects a triggering condition for a transport task for transporting a subject from a first location to a second location via usage of an autonomous vehicle, establishes a negotiated task coordination plan between a user and a third party provider for performing the transport task, and executes the negotiated task coordination plan, wherein the executing causes the autonomous vehicle to travel between the first location and the second location for transporting the subject.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure provides methods, computer-readable media, and processing systems for using machine learning in a platform for optimizing execution of tasks for users. More specifically, the present disclosure provides a task management platform that is trained with machine learning to coordinate the execution of tasks in collaboration with a third party provider. In one illustrative embodiment, the tasks comprise the physical movement or transport of one or more subjects (e.g., one or more persons or objects) between two physical locations, e.g., between a user's home or office location and a third party provider location, e.g., a physical retail store location or an educational institution location (e.g., a school location), and the like.

Given the busy schedules of modern life, people must run numerous errands on any given day. In fact, many of these errands are repetitive and have well defined parameters, e.g., predefined timing parameter, predefined location parameter, and the like. To illustrate, a user may need to shop at a supermarket on a weekly basis to acquire various food items. Many of these food items are often purchased on a regular and periodic basis, e.g., milk, eggs, bread and so on. Similarly, a user may drop of and pick up an individual, e.g., a child who is dropped off at a school in the morning and then picked up from the school in the afternoon. Generally, the drop off time and the pick-up time are predefined and will not change except where the child is engaged in extracurricular activities after school on certain days. However, even such extracurricular activities are often predefined with known time and predefined location. It would be advantageous to have a platform that will learn over time as to the transportation need of a user, e.g., the user's need to transport various subjects (e.g., persons or objects).

In various embodiments of the present disclosure, a computing platform trained with machine learning will assist a user in managing and executing one or more tasks on a daily and/or periodical basis. More specifically, the tasks will be learned over time in order to optimize the execution of the tasks. In one embodiment, the automated execution of each task comprises the deployment of an autonomous vehicle (e.g., an autonomous drone (e.g., an aerial drone), an autonomous motor vehicle (e.g., a car, a bus or a truck), or an autonomous ship, and so on) to transport one or more subjects. Furthermore, the execution of the task(s) is implemented via a task coordination plan established between the present task management platform and a device of the third party provider (e.g., broadly a corresponding task management platform of the third party provider). In brief, the task coordination plan comprises a sequence of actions (with corresponding conditions or parameters) to be taken to bring about the successful execution of the task.

Figure 1:
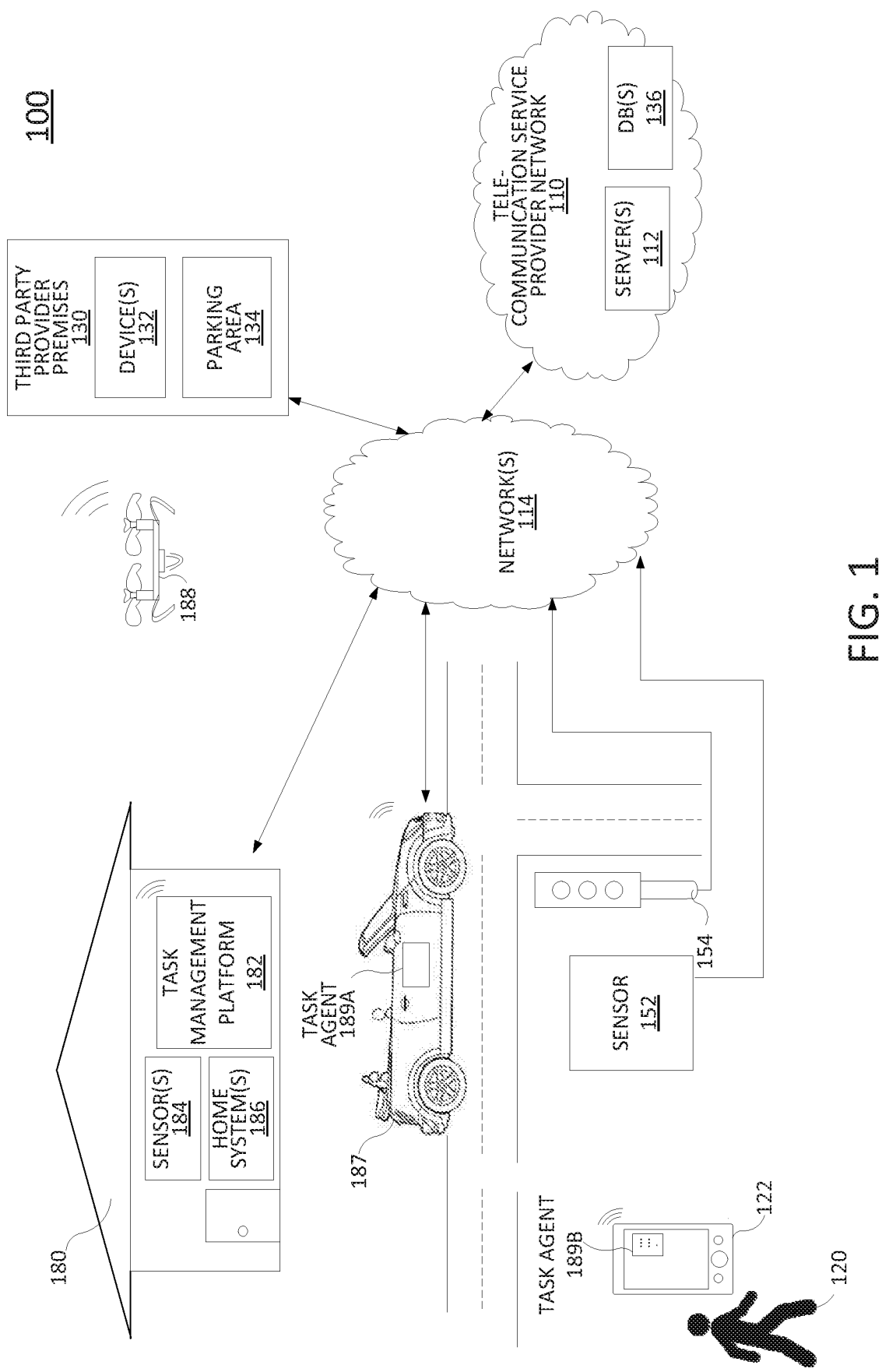
FIG. 1 illustrates an example system related to the present disclosure.

To aid in understanding the present disclosure, FIG. 1 illustrates a block diagram depicting one example of an environment 100 suitable for performing or enabling the steps, functions, operations, and/or features described herein. As illustrated in FIG. 1, the environment 100 includes a telecommunication service provider network 110. In one example, telecommunication service provider network 110 may comprise a core network, a backbone network or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs), and so forth. It should be noted that an IP network is broadly defined as a network that uses Internet Protocol to exchange data packets. However, it will be appreciated that the present disclosure is equally applicable to other types of data units and transport protocols, such as Frame Relay, and Asynchronous Transfer Mode (ATM). In one example, the telecommunication service provider network 110 uses a network function virtualization infrastructure (NFVI), e.g., host devices or servers that are available as host devices to host virtual machines comprising virtual network functions (VNFs). In other words, at least a portion of the telecommunication service provider network 110 may incorporate software-defined network (SDN) components.

In one example, telecommunication service provider network 110 is connected to networks 114. The networks 114 may include a wireless access network (e.g., an IEEE 802.11/Wi-Fi network and the like), a Wide Area Network (WAN), a cellular access network, such a Universal Mobile Telecommunications System (UMTS) terrestrial radio access network (UTRAN), an evolved UTRAN (eUTRAN), a base station subsystem (BSS), e.g., a Global System for Mobile communication (GSM) radio access network (GRAN), a 2G, 3G, 4G and/or 5G network, a Long Term Evolution (LTE) network, and the like), a circuit switched network (e.g., a public switched telephone network (PSTN)), a cable access network, a digital subscriber line (DSL) network, a metropolitan area network (MAN), other types of wired access networks, an Internet service provider (ISP) network, and the like. Alternatively, or in addition, networks 114 may represent enterprise networks, corporate, governmental, or educational institution LANs, a home/residential LAN, and the like. In one embodiment, the networks 114 may all be different types of networks, may all be the same type of network, or some networks may be of a same type and others may be different types of networks. The networks 114 and the telecommunication service provider network 110 may be operated by different service providers, the same service provider, or a combination thereof. For instance, in an example where networks 114 include a cellular access network, telecommunication service provider network 110 may include evolved packet core (EPC) network components, network switching subsystem (NSS)/GSM core network and/or General Packet Radio Service (GPRS) core network components, and so forth. The networks 114 (e.g., access networks) and the telecommunication service provider network 110 may be interconnected via one or more intermediary networks (not shown) which may utilize various different protocols and technologies for transporting communications in the form of data packets, datagrams, protocol data units (PDUs), and the like, such as one or more IP/MPLS networks, one or more frame relay networks, one or more ATM networks, and so forth. In one example, the networks 114 may represent the Internet in general.

Further illustrated in FIG. 1 is one or more servers 112 in telecommunication service provider network 110. The server(s) 112 may each comprise all or a portion of a computing device or system, such as computing system 500, and/or processing system 502 as described in connection with FIG. 5 below, specifically configured to perform various steps, functions, and/or operations for using machine learning in a platform for optimizing execution of tasks for users, as described herein. For example, one of the server(s) 112, or a plurality of servers 112 collectively, may perform operations in connection with the example method 300 or 400, or as otherwise described herein. In one example, the one or more servers 112 may comprise a task management platform 205, as described in greater detail below in connection with the example system 200 of FIG. 2.

Figure 5:
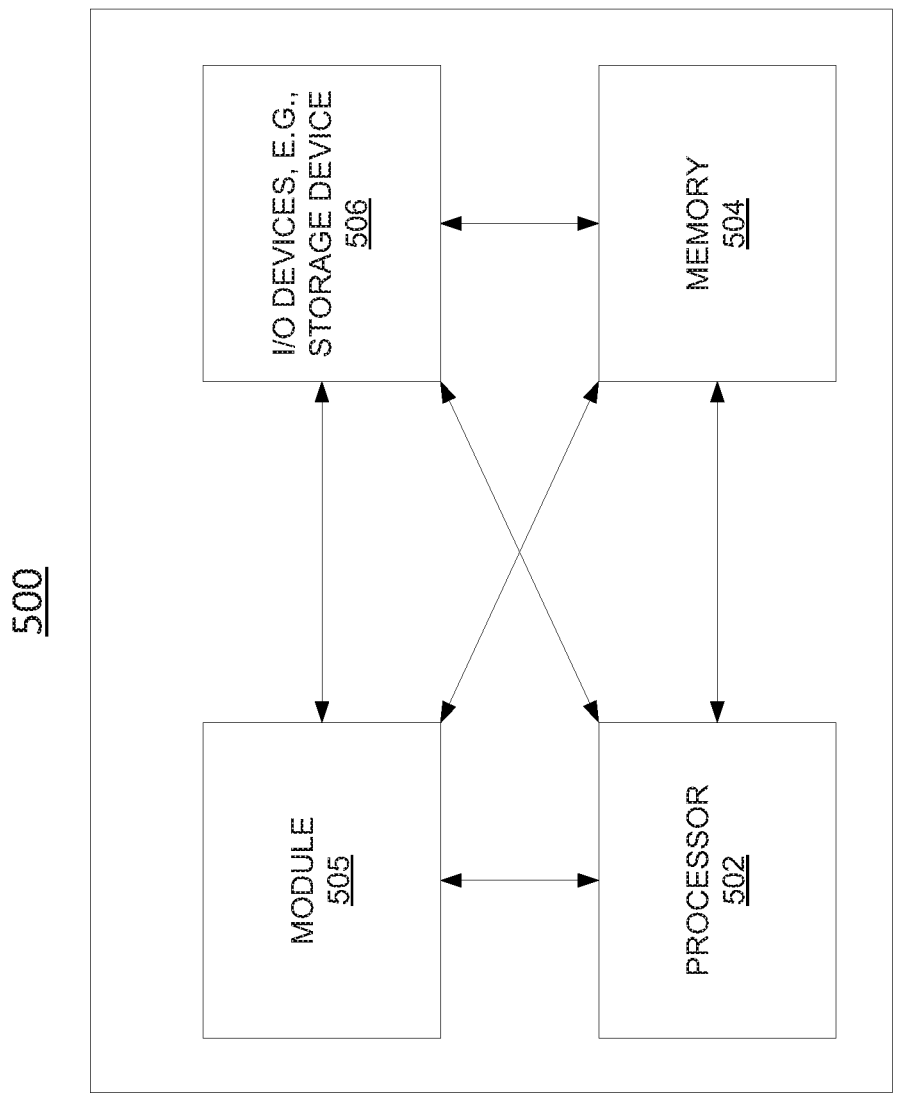
FIG. 5 illustrates an example high-level block diagram of a computing device specifically programmed to perform the steps, functions, blocks, and/or operations described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

In one example, telecommunication service provider network 110 may also include one or more databases (DBs) 136, e.g., physical storage devices integrated with server(s) 112 (e.g., database servers), attached or coupled to the server(s) 112, and/or in remote communication with server(s) 112 to store various types of information in support of systems for using machine learning for optimizing execution of tasks for users, as described herein. In one example, server(s) 112 and/or DB(s) 136 may comprise cloud-based and/or distributed data storage and/or processing systems comprising one or more servers at a same location or at different locations. For instance, DB(s) 136, or DB(s) 136 in conjunction with one or more of the servers 112, may represent a distributed file system, e.g., a Hadoop® Distributed File System (HDFS™), or the like. In one example, DB(s) 136 in conjunction with one or more of the servers 112, may comprise a task management platform 205, as described in greater detail below in connection with the example system 200 of FIG. 2.

In one example, DB(s) 136 may receive and store task data from a variety of different task data sources. For example, the task data sources may include a task management platform 182 and a third party provider device, e.g., a vendor device 132. In one embodiment, a user premises 180, e.g., a home or an office, may comprise a task management platform 182, one or more sensors 184, and one or more home systems 186. It should be noted that although task management platform 182 is shown implemented on the user premises, it is not so limited. In one example, task management platform 182 can be implemented as a network-based task management platform 182, e.g., implemented on the server 112 of network 110. In operation, task management platform 182 is tasked with assisting the user in performing one or more tasks. For example, the task management platform 182 will interact with autonomous unmanned vehicle(s), e.g., an autonomous car 187 or an autonomous drone 188 to run errands on behalf of the user. More specifically, in one embodiment the task management platform 182 is trained with machine learning to assist the user, e.g., a home or business owner, in managing daily and/or periodical tasks within the home/business. By using machine learning, the task management platform 182 will be able to learn over time various tasks that can be effectively performed automatically via the use of autonomous unmanned vehicle(s). One aspect of the present disclosure is the ability of the task management platform 182 to negotiate or deduce a task coordination plan in collaboration with a third party provider or entity, e.g., a retail store, a school, a hospital, a business entity, and so on. In one example, the task coordination plan outlines various parameters that will be followed in achieving the transport of one or more subjects between the user's location (e.g., a home or business) and a third party provider location (e.g., a physical retail store location, a school location, a hospital location, a library location, and on on).

To illustrate, a user may need to run a periodic errand, e.g., acquiring grocery items on a weekly basis. The user may formulate a grocery list of items and drive to a physical supermarket or store to acquire and transport the items back home. Such errand is often performed on a regular basis, e.g., every 4-7 days. In another example, a user may transport the user's children to and from school on a periodic basis, e.g., Monday-Friday during the school year. In another example, a user may travel to a library on a monthly basis to borrow and return books. In yet another example, a user may operate a home business, where the user may drop off on a monthly basis a certain number of finished products to a local distributor or store, e.g., home-made gloves, hats, custom jewelry, and so on. The user in performing these errands will incur a significant amount of time that can be better used in performing other tasks.

In one embodiment, the task management platform 182 will be able to determine which tasks must be completed on behalf of the user and under what conditions or parameters, e.g., time constraints, congestion constraints, cost constraints, power of autonomous vehicle constraints, load constraints and so on. For example, the task management platform 182 may be configured (or automatically learned over time) that the user's child will need to be picked up from school at 2:30 pm in accordance with a school schedule. Knowing the location of the pertinent school and the pertinent time, the task management platform 182 will be able to coordinate the sending of an autonomous vehicle, e.g., autonomous car 187, to arrive at the school location prior to 2:30 pm between Monday-Friday during the school year. The child can then be directed into the autonomous vehicle which will then transport the child home. This will greatly assist the user in performing the daily errand of transporting the child to and from school during the school year. Similarly, many stores (e.g., supermarkets) now offer services when a user may simply provide a list of desired items to be purchased and the stores will acquire those items and package those items to be picked up by the user. Thus, the task management platform 182 will be able to coordinate the sending of an autonomous vehicle, e.g., autonomous car 187 or autonomous drone 188, to arrive at the store location once the desired items have been assembled for pick-up by the store employees. The assembled package(s) can then be placed into the autonomous vehicle which will then transport the assembled package(s) home for the user.

To illustrate, the locations of the store or school as discussed in the above examples have predefined locations. Thus, the coordinates of these third party provider locations (e.g., GPS coordinates) can be configured into the guidance system of the autonomous vehicle. Under the guidance of the guidance system, the autonomous vehicle can be sent to and from these third party provider locations without the need of the user having to travel to and from these third party provider locations.

However, with the proliferation of autonomous vehicles, it is anticipated that an ever greater number of these autonomous vehicles will be deployed to achieve many of these tasks for a multitude of users. Thus, proper coordination will be necessary to avoid unnecessary congestion or safety issues. For example, if a plurality of autonomous cars 187 is simultaneously sent to a school at the same time, the parking area of the school may not be large enough to accommodate the sudden appearance of so many autonomous cars 187 at the same time. Furthermore, the autonomous cars 187 may compete with other manned vehicles (e.g., school buses, manned cars, and so on) that may have higher priority than autonomous cars 187, e.g., since school buses can transport more children. Thus, the ability of the task management platform 182 to know when and how to send the autonomous vehicle to a proper location to achieve a transport task is only half of the equation. It would have to coordinate with the third party provider to ensure that the transport task can be properly executed.

In one embodiment, the task management platform 182 will coordinate with a third party provider device 132, e.g., another task management platform, serving the third party provider. The coordination comprises the generation of a task coordination plan for the transport task. To illustrate, using the above school drop-off and pick-up scenario, the user's task management platform 182 may populate one or more user parameters into the task coordination plan, e.g., 1) an identification of the user, 2) the user's location (e.g., street address or GPS location), 3) the identification of the subject(s) to be transported (e.g., a name of a child, an identification of the child other than the name, e.g., an ID number, a list of products, and so on), 4) the time period that the subject will need to be picked up at the third party provider location, 5) a time range that the user may accept the return of the subject(s), 6) a method of payment for the purchase and/or transport of the subject(s) (where appropriate e.g., purchasing items from a store), 7) an identification of the autonomous vehicle (e.g., a license plate, a marking, a code (e.g., an encrypted code, a QR code, a bar code, a security certificate, and so on), 8) a security or access code to gain entry into the autonomous vehicle (e.g., opening a door or a storage compartment of the autonomous vehicle will require the use of the security or access code to ensure safety of the subject(s)), 9) an authorization or release code to allow the autonomous vehicle to be released or to depart from the third party location (e.g., the authorization code is provided to the autonomous vehicle once the subject being transported has been verified by the user and secured within the autonomous vehicle), or 10) any special requirements to be applied to the subject(s), and so on. This task coordination plan is then sent by the task management platform 182 to the third party device 132 prior to the launching of the autonomous vehicle.

In turn, upon receipt of the task coordination plan from the task management platform 182, the third party provider device 132 will assess whether the one or more user parameters can be met for the transport task. If the one or more user parameters can be met, then the third party device 132 will also need to determine what one or more third party provider requirements will be necessary. For example, it is anticipated that a multitude of task coordination plans will be received on a daily basis from a plurality of users (e.g., parents of students of the school). For example, the school location may have 100 parking spots available to receive 100 vehicles (e.g., manned or autonomous vehicles). The third party device 132 may first reserve 20 parking spots (e.g., closest to the school such as in front of the main entrance of the school) exclusively to be used by school buses. Thus, 80 parking spots are left for assignment, where 40 parking spots will be exclusively reserved for receiving manned vehicles and the remaining 40 parking spots will be exclusively reserved for receiving autonomous vehicles. In one example, the 40 parking spots exclusively reserved for receiving autonomous vehicles will have special identifications and well-defined location coordinates that can be provided to the guidance system of the autonomous vehicles. Given the limitation that there are only 40 parking spots exclusively reserved for receiving autonomous vehicles, the third party provider device 132 will need to coordinate with the various task management platforms 182 from different users that are all sending corresponding task coordination plans for the drop-off and pick-up of their children.

In one example, the third party provider device 132 will assess the total number of task coordination plans that have been received and then determine how many of those task coordination plans can be accommodated for a given specified time period. For example, if 120 task coordination plans are received for pickup of 120 children at 2:30 pm via autonomous vehicles, then realistically only 40 of those 120 task coordination plans can be accommodated for the time period of 2:30 pm. As such, the third party device 132 must stagger the schedule for the reception of the remaining 80 autonomous vehicles, e.g., receiving 40 autonomous vehicles at 2:45 pm and another 40 autonomous vehicles at 3:00 pm. This ability to quantify and then manage the 120 requests for usage of autonomous vehicles for transporting subjects to and from a third party provider location will provide an efficient and safe execution of automated tasks.

In one example, the third party provider device 132 will return each of the task coordination plans back to its corresponding task management platform 182 populated with one or more third party parameters, e.g., 1) an acceptance of the task coordination plan, 2) a rejection of the task coordination plan, 3) a modification of one or more parameters of the task coordination plan, 4) the location coordinates for receiving the user's autonomous vehicle (e.g., the ID or location of a particular parking spot), 5) the time range for receiving the user's autonomous vehicle at the third party location, 6) one or more operational parameters to be used or placed on the user's autonomous vehicle (e.g., the speed of approach of the user's autonomous vehicle, the parking lot entrance to be used by the user's autonomous vehicle to gain access to the designated parking spot, the street to use in heading toward the third party location, the size of the user's autonomous vehicle allowed at the designated parking spot, and so on), 7) the charge associated with the transport of the subject(s) (where appropriate, e.g., transporting items from a store), or 8) the method of payment for the transport of the subject(s) (where appropriate, e.g., transporting items from a store) and so on.

Thus, in one embodiment, the user's task management platform 182 not only deduces the need to execute the automated transport task, but is also tasked with coordinating with the third party provider's task management platform 132 to bring about a successful execution of transporting the subject(s). In one embodiment once the task coordination plan is negotiated and accepted by the two task management platforms, both task management platforms will monitor the execution of the transport task. To illustrate, the user's task management platform 182 may launch the user's autonomous car 187 at 2:45 pm with the target of arriving at a parking spot labeled "10" at the school parking lot at 3:00 pm pursuant to the agreed upon task coordination plan. For example, the user's task management platform 182 will interact with a task agent 189A of the autonomous car 187 to cause the autonomous car 187 to depart the home or business 180 of the user. For example, task agent 189A may comprise an automated service agent, such as a device running a software application (e.g., a machine learning algorithm (MLA)) for detecting certain conditions, for providing alerts, notifications, or control signals in response to such detected conditions or responsive to control signal issues by the user's task management platform 182, and so forth. In one embodiment, the task agent 189A of the autonomous car 187 may coordinate with sensors or Internet of things (IoT) devices (e.g., cameras, microphones, transceivers, RF transceivers, IR transceivers, antennas, and so on) located on the autonomous car 187 to provide feedback information to the user's task management platform 182.

Such feedback information may comprise audio and/or video in front of the autonomous car 187 and the interior of the autonomous car 187, or the GPS coordinates of the autonomous car 187 such that a user 120 located at home 180 via an endpoint device 122 with another task agent 1896 may remotely watch and monitor the progress of the autonomous car 187 as it travels toward the third party provider location, e.g., a parking area 134 of the third party provider premises 130.

Similarly, the feedback information of the autonomous car 187 may also be sent to the third party provider device 132 to allow the third party provider to monitor the progress of the autonomous car 187 as it travels toward the third party provider location. This will allow the third party provider to detect the arrival of the autonomous car 187 at the school. Dedicated school attendants may then escort one or more children to the parking area 134 to wait for the arrival of one or more autonomous cars. Upon arrival, the dedicated school attendants may present a unique security or access code that was previously sent to the school for each autonomous car 187 in the corresponding task coordination plan. Once the child is placed into the autonomous car 187, the third party provider device 132 will signal to the user's task management platform 182 that the subject has been placed and secured inside of the autonomous car 187. The user can then switch to a camera situated within the interior of the autonomous car 187 to verify receipt of the correct subject. Once the user's task management platform 182 provides a confirmation signal to the third party provider device 132, then the third party provider device 132 and/or the dedicated school attendants will allow the autonomous car 187 to depart the school grounds (e.g., providing an authorization code previously provided by the user to the autonomous vehicle 187). Thus, the automated transport of the subject is carefully coordinated and monitored by the two task management platforms including the establishment of all necessary parameters (e.g., status or feedback information, rules of operation, and security or access codes) and protocols (e.g., sequence of actions to be taken for the transport task) as negotiated and stored in the task coordination plan.

Although the above example is described in the context of transporting living subjects, the present disclosure is not so limited. To illustrate, in the context of shopping, the user may have predefined one or more items to be purchased and transported from one or more the third party provider locations, e.g., a supermarket, a bakery, a market, and the like. Similar to the above example, a task coordination plan will be negotiated and finalized between the two task management platforms (e.g., the user and the vendor). Like the school example, the vendor must ascertain how many parking spots are available to accommodate the arrival of autonomous vehicles, e.g., car 187 and/or drone 188. Unlike the school example, autonomous drone 188 can be utilized in the transport of goods which may alter how the vendor parking lot will be configured to accommodate a number of autonomous cars and/or autonomous drones.

In one embodiment, the task management platform 182 will coordinate with a third party provider device 132, e.g., another task management platform, serving the third party provider (e.g., a vendor). The coordination comprises the generation of a task coordination plan for the transport task. In the context of shopping, the user's task management platform 182 may populate one or more user parameters into the task coordination plan, e.g., 1) an identification of the user, 2) the user's location (e.g., street address or GPS location), 3) the identification of the subject(s) to be transported (e.g., a list of products, Universal Product Code (UPC) of the products, product descriptions, and so on), 4) the time period that the subject(s) will need to be picked up at the third party location, 5) a time range that the user may accept the return of the subject(s), 6) a method of payment for the purchase and/or transport of the subject(s), 7) an identification of the autonomous vehicle (e.g., a license plate, a marking, a code (e.g., an encrypted code, a QR code, a bar code, a security certificate, and so on), 8) a security or access code to gain entry into the autonomous vehicle (e.g., opening a door or a storage compartment of the autonomous vehicle will require the use of the security or access code), 9) an authorization code to allow the autonomous vehicle to be released or to depart from the third party provider location (e.g., the authorization code is provided to the autonomous vehicle once the subject being transported has been verified by the user and secured within the autonomous vehicle), 10) the payload weight that the autonomous vehicle is able to carry, or 11) any special requirements (e.g., the need for dry ice, the need for "bubble-wrap" packing material, and the like) to be applied to the subject(s), and so on. This task coordination plan is then sent by the task management platform 182 to the third party provider device 132 prior to the launching of the autonomous vehicle.

In turn, upon receipt of the task coordination plan from the task management platform 182, the third party provider device 132 will assess whether the one or more user parameters can be met for the transport task. If the one or more user parameters can be met, then the third party provider device 132 will also need to determine what one or more third party provider requirements will be necessary. In other words, the third party provider will also have its own requirements that must be complied with in order to fulfill the transport task. For example, it is anticipated that a multitude of task coordination plans will be received on a daily basis from a plurality of users (e.g., people who want to purchase products from the vendors). For example, the vendor location may have 200 parking spots available to receive 100 vehicles (e.g., manned or autonomous vehicles) and 100 drones. The third party provider device 132 may reserve 80 parking spots (e.g., closest to the store such as in front of the main entrance of the store) exclusively to be used by manned vehicles, i.e., vehicles driven by humans. Thus, 20 autonomous car parking spots and 100 autonomous drone parking spots are left for assignment. Similar to the above example, these parking spots may be assigned in accordance with various types of priority order, e.g., first come first serve order, urgent timing order where certain products must be timely delivered, e.g., for a party, or the products may be perishable, loyal customer order where local customers who shop frequently at the store are always provided with priority for available parking spots, dollar value spent order, where large orders are given priority over smaller orders, and so on. These types of priority orders are only illustrative and should not be interpreted as limitations of the present disclosure.

In one example, the third party provider device 132 will assess the total number of task coordination plans that have been received and then determine how many of those task coordination plans can be accommodated for a given specified time period. For example, if 300 task coordination plans are received for pickup of 300 orders at 2:30 pm via autonomous vehicles, then realistically only 120 (e.g., 20 orders via autonomous car parking spots and 100 autonomous drone parking spots) of those 300 task coordination plans can be accommodated for the time period of 2:30 pm. As such, the third party provider device 132 must stagger the schedule for the reception of the remaining 180 autonomous vehicles, e.g., receiving 100 autonomous vehicles at 3:00 pm and another 80 autonomous vehicles at 3:30 pm and so on. This ability to quantify and then manage the 300 requests for usage of autonomous vehicles for transporting purchased items to and from a third party provider location will provide an efficient and safe execution of automated tasks.

In one example, the third party provider device 132 will return each of the task coordination plans back to its corresponding task management platform 182 populated with one or more third party provider parameters, e.g., 1) an acceptance of the task coordination plan, 2) a rejection of the task coordination plan, 3) a modification of one or more parameters of the task coordination plan, 4) the location coordinates for receiving the user's autonomous vehicle (e.g., the ID or GPS coordinates of a particular parking spot), 5) the time range for receiving the user's autonomous vehicle at the third party provider location, 6) one or more operational parameters to be used or placed on the user's autonomous vehicle (e.g., the speed of approach of the user's autonomous vehicle, the parking lot entrance to be used by the user's autonomous vehicle to gain access to the designated parking spot, the street to use in heading toward the third party provider location, the size of the user's autonomous vehicle allowed at the designated parking spot, and so on), 7) the charge associated with the transport of the subject(s), or 8) the method of payment for the transport of the subject(s) and so on.

Thus, in one embodiment, the user's task management platform 182 not only deduces the need to execute the automated transport task, but is also tasked with coordinating with the third party provider task management platform 132 to bring about a successful execution of transporting the subject(s). In one embodiment once the task coordination plan is negotiated and accepted by the two task management platforms, both task management platforms will monitor the execution of the transport task. To illustrate, the user's task management platform 182 may launch the user's autonomous car 187 at 2:15 pm with the target of arriving at a parking spot labeled "20" at the supermarket parking lot at 3:00 pm pursuant to the agreed upon task coordination plan. For example, the user's task management platform 182 will interact with a task agent 189A of the autonomous car 187 to cause the autonomous car 187 to depart the home or business 180 of the user. For example, task agent 189A may comprise an automated service agent, such as a device running a software application (e.g., a machine learning algorithm (MLA)) for detecting certain conditions, for providing alerts, notifications, or control signals in response to such detected conditions or responsive to control signal issues by the user's task management platform 182, and so forth. In one embodiment, the task agent 189A of the autonomous car 187 may coordinate with sensors or Internet of things (IoT) devices (e.g., cameras, microphones, transceivers, RF transceivers, IR transceivers, antennas, and so on) located on the autonomous car 187 to provide feedback information to the user's task management platform 182. Such feedback information may comprise audio and/or video in front of the autonomous car 187 and the interior of the autonomous car 187, or the GPS coordinates autonomous car 187 such that a user 120 located at home 180 via endpoint device 122 and associated task agent 189B may remotely watch and monitor the progress of the autonomous car 187 as it travels toward the third party provider location, e.g., a parking area 134 of the third party provider premises 130, e.g., the parking lot of a supermarket.

Similarly, the feedback information of the autonomous car 187 may also be sent to the third party provider device 132 to allow the third party provider to monitor the progress of the autonomous car 187 as it travels toward the third party provider location. This will allow the third party provider to detect the arrival of the autonomous car 187 at the supermarket. Dedicated supermarket attendants may then bring out packages of the ordered items to the parking area 134 to load onto one or more autonomous vehicles. Upon arrival, the dedicated supermarket attendants may present a unique security or access code that was previously sent to the supermarket for each autonomous vehicle, e.g., car 187 or drone 188, in the corresponding task coordination plan. Once the package(s) is placed into the autonomous vehicle, the third party provider device 132 will signal to the user's task management platform 182 that the package(s) has been placed and secured inside of the autonomous vehicle. The user can then switch to a camera situated within the interior of the autonomous vehicle to verify receipt of the correct package. Once the user's task management platform 182 provides a confirmation signal to the third party provider device 132, then the third party device 132 and/or the dedicated supermarket attendants will allow the autonomous vehicle to depart the supermarket grounds (e.g., providing an authorization code previously provided by the user specifically for the autonomous vehicle). Again, the automated transport of the subject is carefully coordinated and monitored by the two task management platforms including the establishment of all necessary parameters (e.g., information, rules and codes) and protocols (e.g., sequence of actions to be taken) as stored in the task coordination plan.

In one embodiment, the transport tasks could be scheduled for one occurrence, for recurring occurrences at certain time/date, for following a user or a family calendar, and/or dependent on other events (e.g., triggered by a machine learning algorithm). Furthermore, in one embodiment all scheduled transport tasks (not yet completed) and completed transport tasks will be logged and generated in a report. This will allow the task management platform 182 to dynamically analyze the reports to find better and more efficient ways to perform the automated transport tasks.

In one embodiment, the task management platform 182 will request user's authorization before executing one or more transport tasks, such as transporting human subjects or where a purchase order greater than a predefined monetary amount, e.g., greater than $100, $250, $500, or $1,000 and so on. Alternatively, the task management platform 182 may not need to request a user's authorization, but instead provides a notification (e.g., a text message, an email message, an audio message, a flashing icon on a mobile screen utilized by the user, a live video feed from the launched autonomous vehicle, and so on). Different acknowledgment responses can be used, e.g., detecting the user swiping away the notification on a user device screen, detecting that the user is watching the live video feed provided from the autonomous vehicle in the process of executing the transport task, and so on. If the user does not interrupt or terminate the transport task but does acknowledge the receipt of the notification, then the transport task may proceed or continue to proceed according to the task coordination plan.

It should be noted various sensor(s) 152 (e.g., deployed in any public areas) and 154 (e.g., deployed on traffic lights or traffic signals), can be used to interact with the autonomous vehicles. The sensors may comprise cameras, RF detectors, IF detectors, microphones, and the like. For example, such sensor(s) can be used to detect and monitor the progress of the autonomous vehicles as they progress in the transport tasks. This will add an additional layer of security in monitoring the movements of a multitude of autonomous vehicles. For example, if the onboard video feed of an autonomous vehicle is lost, the task management system 182 may leverage the network of sensors to detect the current location of the autonomous vehicle, e.g., the RFID of the autonomous vehicle is detected at a particular street light at a particular time. This will allow the task management platform 182 to continue the tracking of the autonomous vehicle even if certain sensors or reporting systems of the autonomous vehicle suffer a failure, a degradation of performance or interference. In one embodiment, the sensors 152 and 154 may comprise transceivers for communicating with the autonomous vehicles as well. This will allow the ability to dynamically issue commands to the autonomous vehicle or receive status from the autonomous vehicle from multiple points along the route taken by the autonomous vehicle.

More specifically, various sensors 152 and 154 (e.g., RF receivers, cameras, IR receivers and the like) may be deployed in various public locations, e.g., on a traffic light, on a street light, on a toll plaza, on buildings, on WiFi access points, on automated drones (not associated with the user), and the like. Such sensors may have the ability to interact with the task management platform 182 and/or a user mobile endpoint device 122, e.g., a smart phone, to detect the user's autonomous vehicle presence. If authorized by the user, such sensors may provide data, e.g., location or presence information, captured audio information, captured video information, captured still image information, and the like, on a continual basis to the present task management platform 182.

It should be noted that the environment 100 has been simplified. In other words, the environment 100 may be implemented in a different form than that illustrated in FIG. 1. For example, the environment 100 may be expanded to include additional networks, and additional network elements (not shown) such as wireless transceivers and/or base stations, border elements, routers, switches, policy servers, security devices, gateways, a network operations center (NOC), a content distribution network (CDN) and the like, without altering the scope of the present disclosure. In addition, environment 100 may be altered to omit various elements, substitute elements for devices that perform the same or similar functions and/or combine elements that are illustrated as separate devices.

Figure 2:
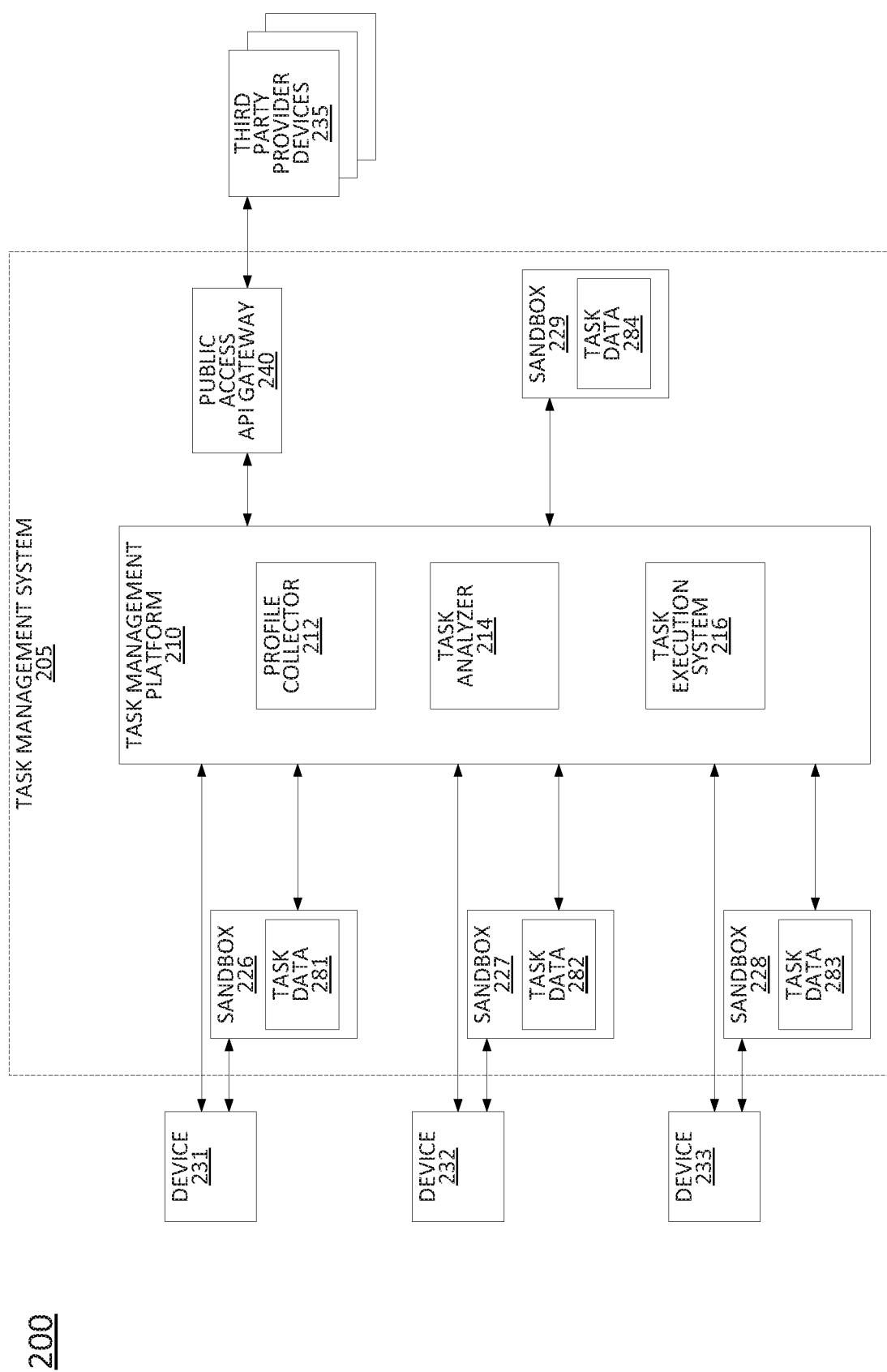
FIG. 2 illustrates an example task management system, according to the present disclosure.

FIG. 2 illustrates an example network 200 including a task management system 205 (e.g., a network-based task processing system). In one example, the task management system 205 includes a network based task management platform 210, e.g., a server or multiple servers collectively configured to perform various steps, functions, and/or operations in accordance with the present disclosure. It should also be noted that the components of network based task management platform 210 and the task management system 205 may comprise various combinations of computing resources (e.g., processor(s), memory unit(s), and/or storage unit(s)) on the same or different host devices, at the same or different locations (e.g., in the same or different data centers). For example, processors assigned to execute instruction sets for different components may be separate from the associated memory resources, which may be separate from associated storage resources where data sets or other data which may be processed via the different components may be stored, and so on.

As further illustrated in FIG. 2, the task management system 205 includes a plurality of sandboxes 226-229 (e.g., "private sandboxes") and a public access application programming interface (API) gateway 240. In various examples, sandboxes 226-229 (broadly storage locations), the task data sets 281-284 stored in the different sandboxes 226-229, and/or the public access API gateway 240, may comprise virtual machines, application containers, or the like operating on one or more host devices. In addition, sandboxes 226-229, the task data sets 281-284 stored in the different sandboxes 226-229, and/or the public access API gateway 240 may comprise various combinations of computing resources, e.g., processor(s), memory unit(s), and/or storage unit(s) on one or more shared host devices and/or on separate host devices. Each of the task data sets 281-284 may take a variety of different forms, e.g., table-based records, video, audio, documents in various formats, and so forth. However, for non-table based data sets, metadata regarding the various data/records may be maintained in table form. In one example, the task management system 205 may comprise a relational database system (RDBS). However, in other, further, and different examples, task management system 205 may comprise a different type of database system, such as a hierarchical database system, a graph-based database system, etc.

The task management system 205 may provide services to a number of different users, and interact with a number of user devices, such as user devices 231-233 and third party provider devices (e.g., vendor devices) 235. Each of the user devices may comprise a desktop computer, a cellular smart phone, a laptop, a tablet computer, a cloud based processing system providing a user environment, a server, and so forth. In particular, task management system 205 may be operated by a trusted party (e.g., a network service provider, e.g., a telecommunication network service provider) to store task data sets on behalf of task data owners in a secure and restricted manner, and to provide third party providers with task data sharing community-based access to multiple task data sets in accordance with authorizations/permissions from task data owners for implementing transport tasks of subjects.

To illustrate, sandbox 226 may store task data set 281 for a first task owner, who may be interested in acquiring medications from a pharmacy. The task data set 281 may include raw data (e.g., biometric sensor data, medication data, medical condition data, physical weight data of one or more users, and so on) and/or may include task data that is normalized, transformed, tagged, etc. (e.g., health summary records) before uploading to the task management system 205. In one example, the task data in data set 281 may be uploaded via user device 231 and stored in sandbox 226. Alternatively, or in addition, the task management system 205 may be configured to obtain and/or receive the task data comprising task data set 281 directly from biometric sensors of various individuals (not shown). The sandbox 226 may represent a secure data storage and data processing environment that is only accessible to the first task owner (or another person or entity authorized on behalf of the first task owner) and to the task management system 205. Having access to a user's medical information and/or current biometric data will assist the task management platform 210 in providing the most relevant and appropriate actions on behalf of the user. For example, knowing the user's current biometric data (e.g., blood sugar level) coupled with the user's need for a medication (e.g., insulin shots) to treat a particular medical conditions (e.g., diabetic conditions) within a particular time frame (e.g., fairly soon, e.g., within the next few hours) will allow the task management platform 210 to interact with the third party provider device 235, e.g., a pharmacy device, to bring about an automated transport task of obtaining the medication from the pharmacy and delivering the medication to the user in a timely manner. More importantly, the availability of the above information allows the task management platform 210 to negotiate with the third party provider device 235 to implement a task coordination plan that will account for the user's relative urgency in needing the subject of the transport task. In other words, some transport tasks are more urgent than other transport tasks. By knowing the context of a particular transport task scheduled for a particular user, task management platform 210 will be able to properly prioritize some transport tasks over other transport tasks that are not time sensitive. Similarly, knowing that the user may potentially be anxious via the current biometric data (e.g., the user's heart rate and blood pressure are elevated due to the user being anxious that the medication may not arrive in a timely manner) may impact how the task management platform 210 will execute the transport task, e.g., elevating the urgency and timeliness of the transport task.

Similarly, sandbox 227 may store task data set 282 for a second task data owner, which may comprise a home system 186. In one embodiment, the home system 186 may comprise a smart appliance (e.g., a smart refrigerator, a smart washer, a smart dryer, and the like) that has the capability to order necessary items, e.g., grocery items from a smart refrigerator, a replacement part for a smart washer or dryer. Such ordering of items can be implemented with machine learning, e.g., monitoring the user's consumption of grocery items over a period of time by a smart refrigerator to deduce a pattern of grocery items consumption, thereby leading to a prediction as to which grocery items are being consumed and the rate of such consumption. Once such pattern is established via stored task data 282, the task management platform 210 will be able to execute the transport task to schedule the necessary grocery items to be transported to the home of the user. Again, the task data set 282 may include raw data and/or may include task data that is normalized, transformed, tagged, etc. before uploading to the task management system 205. In one example, the task data in data set 282 may be uploaded via user device 232 (e.g., a smart refrigerator) and stored in sandbox 227. Alternatively, or in addition, the task management system 205 may be configured to obtain and/or receive the task data comprising task data set 282 directly from various home systems (not shown). For instance, the task data may include images or videos of compartments within a home appliance, appliance diagnostics, appliance usage information, appliance electric or power usage, and so forth. The sandbox 227 may represent a secure data storage and data processing environment that is only accessible to the second task data owner (or another person or entity authorized on behalf of the second task data owner) and to the task management system 205.

In addition, sandbox 228 may store task data set 283 for a third task data owner, e.g., a user who needs to transport a human/animal subject, e.g., a child to and from school, an elderly person to and from a community or senior center, a pet to and from a veterinarian office or a pet groomer, and the like. The task data may comprise the identification of the subject (e.g., name and age of the child, the elderly person, or the pet), the time for drop out and/or pickup, the length of time of travel, the identification of the autonomous vehicle to be used in the transport, various access or authorization codes, origination and destination location information, and the like. Again, the task data set 283 may include raw data and/or may include task data that is normalized, transformed, tagged, etc. before uploading to the task management system 205. In one example, the task data in task data set 283 may be uploaded via user device 233 and stored in sandbox 228. The sandbox 228 may represent a secure data storage and data processing environment that is only accessible to the third task data owner (or another person or entity authorized on behalf of the third task data owner) and to the task management system 205. Having access to task data relative to a user will assist the task management platform 210 to implement a more efficient transport task of the subject(s). For example, knowing a particular user's child needs to be picked up from school and transported to a marching band practice at a different location within a tight time constraint will impact how task management platform 210 will prioritize a multitude of automated transport tasks to be accomplished for a multitude of users whose children must be picked up from school at relatively the same time. Thus, storing the task data for a multitude of users that will be easily accessible by the task management platform 210 will expedite a streamlined process involving numerous deployment of autonomous vehicles.

In one example, task data owners may make portions of the task data sets 281-283 available to other users of the task management system 205. For instance, task management platform 210 may run one or more event detection filters for detecting trigger conditions for one or more events. In one embodiment, the detected trigger condition pertains to an event that may affect a group of users, e.g., parents of children who are in a marching band, parents of children who are in a church youth group, parents of children who are in a school sports team, users who are members of a purchasing group for one or more items and the like. To illustrate, some parents of children of a marching band may offer their autonomous vehicles to be shared in the transport of members of the marching band to a sporting event after school. In doing so, these parents may allow their task data to be accessible by other tasks data owner, i.e., other parents of children who are in the marching band will be able to see that some parents are offering their autonomous vehicles to be shared in the transport of any members of the marching band to the sports event after school. Thus, a parent who wants her child to catch a ride with such autonomous vehicles is able to see which parents are making such offers and may select an autonomous vehicle associated with a friend of the user's child, thereby allowing her child to share a ride with a friend.

Similarly, users who are members of a purchasing group for one or more items may also allow their task data to be accessible by other tasks data owner, i.e., other users who are in the same home development may see that some users are offering their autonomous vehicles to be shared in the transport of the group purchased items back to the same home development. For example, neighbors may group together and purchase a plurality of the same item from a retailer to gain an advantage in the pricing of the item purchased in bulk. For example, a group of neighbors may all want to purchase a portable generator from a retailer. When the set of portable generators is ready for pick-up at the retailer location, some neighbors will be able to see which other neighbors are making such offers and may select an autonomous vehicle associated with a particular neighbor who is a close friend to share the transport of the portable generators back to their homes, and the like. Such sharing of task information will allow the task management platform 210 to make the proper scheduling decisions in addition to reducing the total number of autonomous vehicles needed to achieve the required number of transport tasks to be performed.

In one embodiment, the trigger conditions may be detected via task data of any one or more of the task data sets 281-283. In one example, owners of task data sets 281-283 may grant permission for the task management platform 210 to scan all or a portion of the task data of the task data sets 281-283 for such purposes. In one example, when a trigger condition is detected, network-based task management platform 210 may dynamically create another sandbox 229 and populate the sandbox 229 with the relevant task data 284 for use by a new task sharing community for a newly detected transport task event associated with one or more users. Namely, a new task sharing community can be created for each transport task involving the sharing of one or more autonomous vehicle. This dynamic establishment/teardown of task sharing communities allows the task management platform 210 to quickly and efficiently schedule the various task coordination plans as discussed above. Namely, any user is given the option to engage in the sharing of an autonomous vehicle belonging to another user who is willing to share his or her autonomous vehicle in the transport of a subject. Ultimately, such sharing by users will improve on the efficiency of large scale use of autonomous vehicles which will benefit all users.

In addition, task management platform 210 may gather task data from any one or more of the task data sets 281-283 and copy the task data to the task data set 284 in sandbox 229. For example, the task management platform 210 may access task data sets 281-283 to obtain the relevant data, to filter, join, select columns, generate projections, and/or perform other operations in accordance with the event type template. In one example, the network-based task management platform 210 is granted read-only access to the task data sets 281-283.

It should be noted that task data in the task data sets 281-283 may have time-based rules for data expiration, data aggregation or summarization, or the like. However, in one example, the occurrence of an event, and hence the establishment of a task sharing community, may cause various task data of the task data sets 281-283 to be maintained in a particular format and/or retained in the task management system 205 for longer than would otherwise be the case. In one example, the network-based task management platform 210 may also begin to gather new task data from external data sources when a task sharing community is established. For instance, task data owner device 233 may not typically upload task data to the task management system 205. However, the owner of task data owner device 233 may have agreed to contribute task data in connection with a particular task sharing community (e.g., when the trigger condition for establishing the task sharing community is encountered such as a particular type of transport task, e.g., transporting the marching band to a sports event). Thus, in one example, the network-based task management platform 210 may create sandbox 228 and begin populating task data set 283 with task data from user device 233. This may be performed as an alternative or in addition to logging task data into task data set 284 of sandbox 229 that is created exclusively for the task sharing community when the task sharing community is initially established. In one example, the network-based task management platform 210 may further apply transformations to the task data in accordance with the event type, e.g., anonymizing certain fields in a database, excluding certain rows or columns of data, extracting records for certain time periods and omitting the remainder, and so forth.

In one example, network-based task management platform 210 may also provide via the public access API gateway 240 one or more tickets (e.g., a Kerberos ticket, an X.509 certificate, or the like), to allow third party provider devices 235 to access the sandbox 229 and/or task data set 284 to retrieve the relevant task data associated with the transport task. In one example, network-based task management platform 210 may also push task data from task data set 284 (e.g., task data collected from task data sets 281-283 and/or from external task data source devices of the task sharing community in accordance with the event type) to third part provider devices 235 in accordance with the event type.

It should also be noted that one or more of the third party provider devices 235 may comprise a third party task management platform, such as a device running an application (e.g., a MLA) for effecting a plurality of transport tasks. For example, one of third party provider devices 235 may be able to detect autonomous vehicle license plates in images or videos, to perform optical character recognition on detected license plates to determine the license plate numbers, and so forth. Various additional third party provider devices 235 may comprise third party task management platforms of a same or a similar nature.

In one embodiment, the network based task management platform 210 comprises a profile collector 212, a task analyzer 214, and task execution system 216. The task analyzer uses machine learning to determine a current transport task to be executed for a user who is interacting with a third party provider, e.g., a store or a school, and will determine one or more parameters and one or more actions to be taken to bring about the transport task. In one embodiment, the one or more parameters and the one or more actions to be taken are presented to the third party provider via a task coordination plan. In turn, the third party provider will analyze the task coordination plan received from the user and will accept, reject, and/or modify the task coordination plan to arrive at a "negotiated" task coordination plan that will address both the user and the third party provider constraints in order to bring about the transport task via use of an autonomous vehicle.

In one embodiment, the task management platform 210 is implemented with a machine learning algorithm (MLA) that may comprise at least one of: a deep neural network (DNN), a generative adversarial network (GAN), or the like. In one example, the machine learning algorithm may further include an exponential smoothing algorithm, (e.g., Holt-Winters triple exponential smoothing) and/or a reinforcement learning algorithm. It should be noted that various other types of MLAs and/or MLMs may be implemented in examples of the present disclosure, such as k-means clustering and/or k-nearest neighbor (KNN) predictive models, support vector machine (SVM)-based classifiers, e.g., a binary classifier and/or a linear binary classifier, a multi-class classifier, a kernel-based SVM, etc., a distance-based classifier, e.g., a Euclidean distance-based classifier, or the like, and so on.

For example, the task analyzer 214 of the task management platform 210 once trained with the MLA, will interact with the profile collector 212 and task execution system 216 to provide a platform for optimizing execution of tasks for users via the use of autonomous vehicles. As discussed above, the profile collector 212 may receive, organize and/or store task data that are received from one or more user devices. The task analyzer 214 will utilize the collected task data to deduce and negotiate a task coordination plan to arrive at the most efficient method of effecting a transport task, where the task execution system 216 is then tasked with executing any actions presented by the task analyzer 214, e.g., via the negotiated task coordination plan. For example, the task execution system 216 may comprise one or more hardware systems with software applications for sending control signals to a task management platform 182, to an autonomous vehicle, to one or more sensors and the like. The operations of the task management platform will be discussed in view of FIG. 3 below.

Finally, it should also be noted that the example of FIG. 2 is provided only as an illustrative example. In other words, in other, further, and different examples, the task management system 205 may comprise a different architecture. For instance, operations that are described as being performing in connection with one component may alternatively or additional be performed by a different component. In addition, while the task data sets 281-284 are illustrated as residing within sandboxes 226-229, it should be noted that the actual storage of task data sets 281-284 may be distributed in a plurality of different storage devices which may reside within a plurality of different physical locations, where the sandboxes 226-228 comprise environments where the respective task data sets 281-283 can be fully or partially accessed. For example, sandboxes 226-228 may each represent at least a portion of a respective user application provided to user devices 231-233 via the task management system 205. For instance, the user applications may run on network-based processors and memory units of task management system 205, where the sandboxes 226-228 may possess security tokens (e.g., decryption keys) for rendering task data sets 281-283, respectively. Thus, the storage locations of the task data sets 281-283 may be arbitrary, and the user devices 231-233 and third party provider devices 235 may interact with the task data sets 281-284, perform data analysis, visualizations, and so forth via the respective user applications hosted by the hardware of task management system 205. In one example, task data sets 281-284 may be part of a set of file stores such as a Hadoop Distributed File System (HDFS) and/or another cloud file storage system. Thus, these and other variations, modifications, and/or enhancements, are all contemplated within the scope of the present disclosure.

Figure 3:
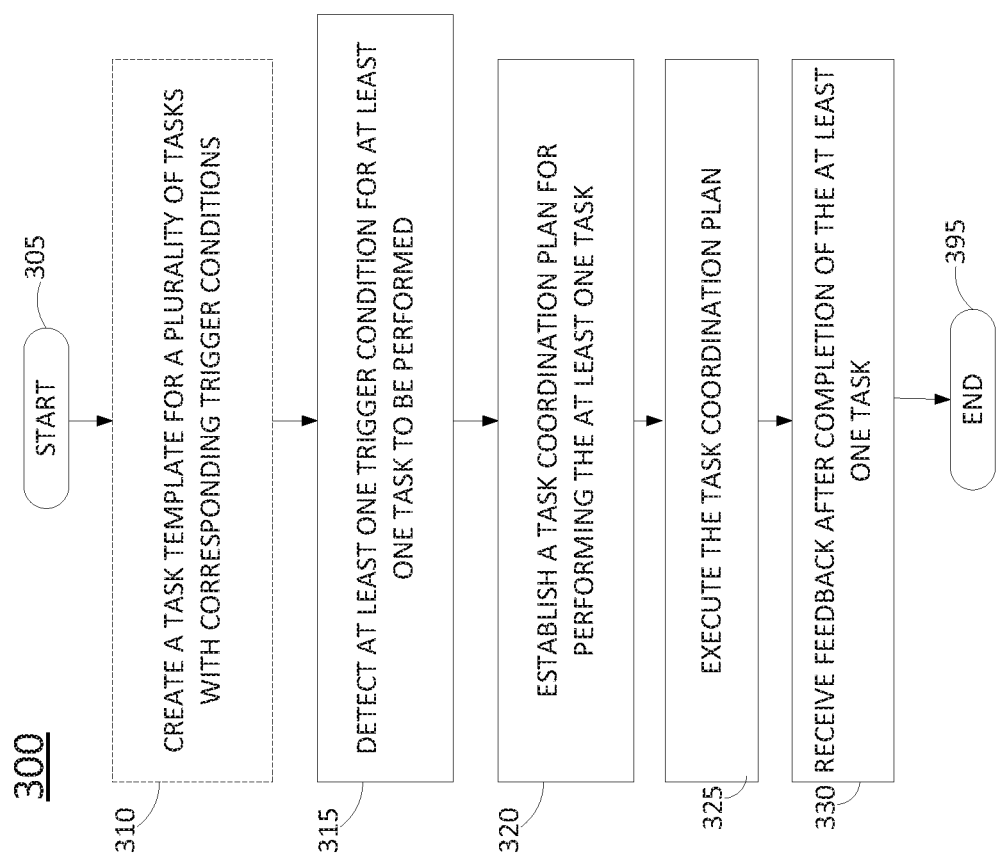
FIG. 3 illustrates a flowchart of an example method for optimizing execution of tasks for users, in accordance with the present disclosure.

FIG. 3 illustrates a flowchart of an example method for optimizing execution of tasks for users via the use of autonomous vehicles, in accordance with the present disclosure. In one example, steps, functions and/or operations of the method 300 may be performed by a device as illustrated in FIG. 1, e.g., one or more of servers 112, or by a network-based task management platform 210 as illustrated in FIG. 2. Alternatively, or in addition, the steps, functions and/or operations of the method 300 may be performed by a processing system collectively comprising a plurality of devices as illustrated in FIG. 1 such as one or more of servers 112, DB(s) 136, user device 122, task agents 189A-189B, sensors 152 or 154, and so forth, or as illustrated in FIG. 2, such as network based task management platform 210, task management system 205, user devices 231-233, third party provider devices 235, and so forth. In one example, the steps, functions, or operations of method 300 may be performed by a computing device or system 500, and/or a processing system 502 as described in connection with FIG. 5 below. For instance, the computing device 500 may represent at least a portion of a platform, a server, a system, a device and so forth, in accordance with the present disclosure. For illustrative purposes, the method 300 is described in greater detail below in connection with an example performed by a processing system. The method 300 begins in step 305 and may proceed to optional step 310.

At optional step 310, the processing system may create a task template for a plurality of tasks with corresponding trigger condition(s), e.g., via the use of a machine learning algorithm. For example, for each user a machine learning algorithm may detect one or more transport tasks of subject(s) that are performed on a regular or periodic basis, e.g., transport of grocery items or a child to and from a school. The machine learning algorithm may also learn the associated trigger condition(s) for each of the transport tasks, e.g., the subject of the transport task, the origination and destination locations for the transport task, the timing of the transport task, the type of autonomous vehicle to be used for executing the transport task, and so on. The task template may also set out the requirements for the establishment/teardown of a task sharing community as discussed above. For example, the requirements may include at least one trigger condition for sharing task data, a duration of time associated with a detection of the at least one trigger condition for which the task data is shareable, data fields of the task data which are shareable in connection with the transport task, and associated permission levels for access of the task data. The expiration condition may comprise a particular time, a duration of time since the creation, or may comprise a signal received from one or more of the use devices 231-233 and third party provider devices 235 to end the task sharing community.

At step 315, the processing system detects, at least one trigger condition for at least one task, e.g., a transport task, to be performed, e.g., the time is approaching where a child is expected to come home from school. In one example, the trigger condition may be based upon sensor data (e.g., on/off, measurement value exceeded, etc.) or may be in accordance with one or more automated agents, e.g., a machine learning algorithm (MLA) to detect various needs associated with the user, e.g., needed grocery items, needed transport of individuals and/or animals to and from different physical locations (e.g., a home, a work office, a school, a community center, an airport, a bus station, a train station, a field, an arena, a building, and so on), the presence of an autonomous vehicle, the presence of a user at a particular location (e.g., a parent is stuck in traffic coming from a work location but is expected to be too late to arrive at a school to pick up a child), from sensor data from a plurality of sensors and/or from an image, sound, and/or video feed, and so forth. In one example, the user may simply inform the network based task management platform 210 that a particular transport task is to begin via user input, e.g., via the task agent 189B on the user's mobile endpoint device 122. In one example, the trigger condition may be in accordance with a task template that dictates how to interpret a triggering condition for starting a transport task for each registered user.

At step 320, the processing system establishes a task coordination plan for the transport task. In one embodiment, the establishment of the task coordination plan comprises a negotiation with a third party provider. Once negotiated, a negotiated task coordination plan for the transport task is established that accounts for both user constraints and third party provider constraints. In one embodiment, a task sharing community is also established as discussed above.

At step 325, the processing system executes the task coordination plan (e.g., a negotiated task coordination plan) for the transport task. Namely, the steps or actions of the task coordination plan for the transport task will be carried out in accordance with the operational parameters as specified in the task coordination plan for the transport task. For example, broadly the execution of the task coordination plan will cause an autonomous vehicle to travel between a first location (e.g., a user location or a third party provider location) and a second location (e.g., the third party provider location or the user location) for transporting a subject.

At step 330, the processing system receives feedback after completion of the transport task. For example, the user may provide feedback as to the performance of the transport task, e.g., the user may provide comments as to: 1) timeliness of the transport task, 2) problems detected or encountered during the transport task, 3) the interaction with third party provider employees during the transport task, and so on. On the third party provider side, the third party provider may also provide feedback as well as to: 1) performance of the autonomous vehicle sent to the third party provider location (e.g., timeliness of the arrival of the autonomous vehicle, carrying capability of the autonomous vehicle, and so on), 2) responsiveness of the user when a query is sent to the user, and so on. Such feedback can be used to improve the performance of the task management platform 210 e.g., via the MLA. At step 395, the method 300 ends.

It should be noted that the method 300 may be expanded to include additional steps or may be modified to include additional operations with respect to the steps outlined above. For example, the method 300 may be expanded to include repeating steps 315 and 330 through multiple iterations for a plurality of transport tasks. Thus, these and other modifications are all contemplated within the scope of the present disclosure.

Figure 4:
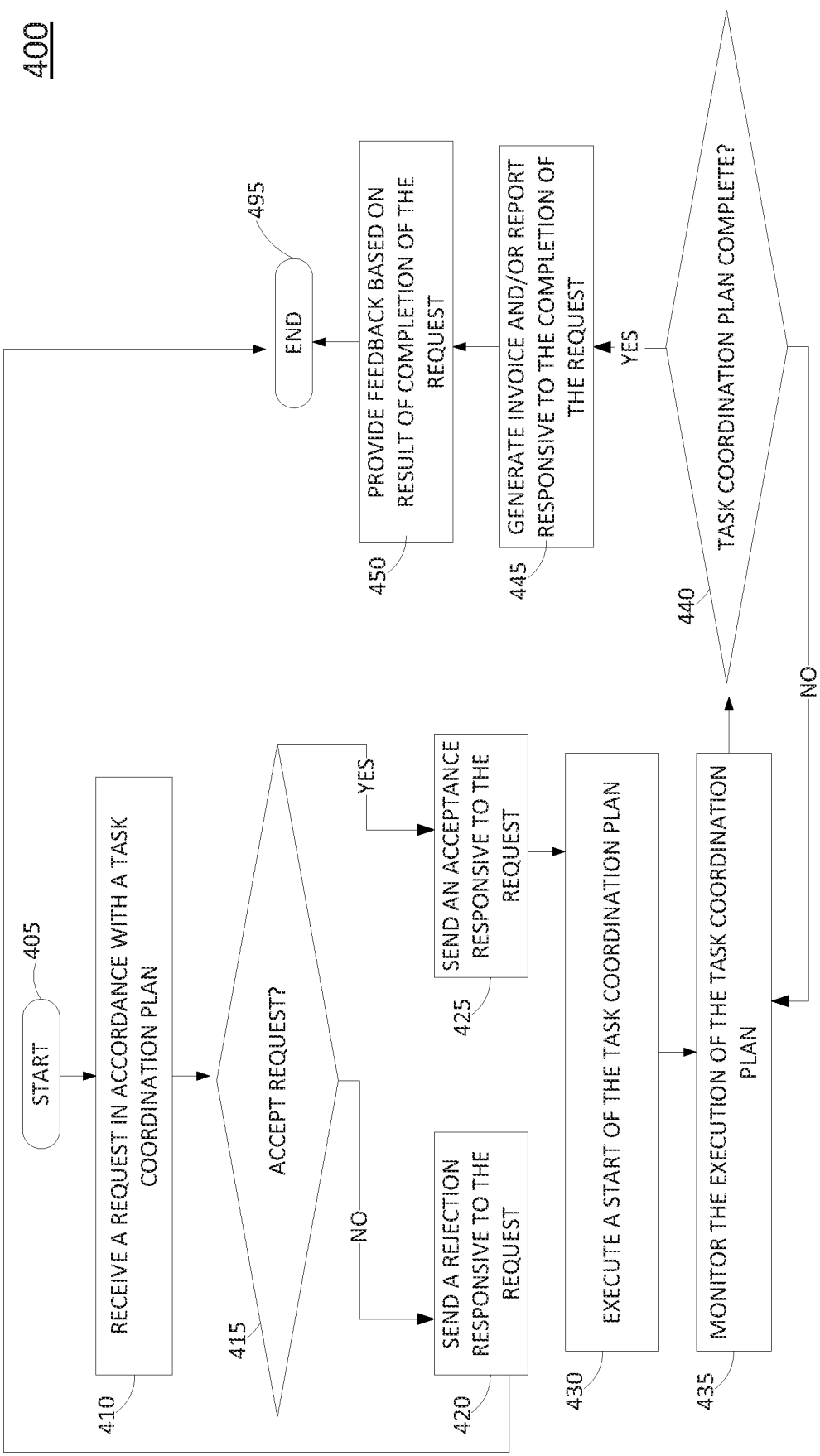
FIG. 4 illustrates a flowchart of an example method for optimizing execution of tasks for third party providers, in accordance with the present disclosure.

FIG. 4 illustrates a flowchart of an example method 400 for optimizing execution of tasks for third party providers, in accordance with the present disclosure. In one example, steps, functions and/or operations of the method 400 may be performed by a third party provider device 132 as illustrated in FIG. 1, e.g., one or more of servers 112, or by a network-based task management platform 210 as illustrated in FIG. 2. Alternatively, or in addition, the steps, functions and/or operations of the method 400 may be performed by a processing system collectively comprising a plurality of devices as illustrated in FIG. 1 such as one or more of servers 112, DB(s) 136, user device 122, task agents 189A-189B, sensors 152 or 154, and so forth, or as illustrated in FIG. 2, such as network based task management platform 210, task management system 205, user devices 231-233, third party provider devices 235, and so forth. In one example, the steps, functions, or operations of method 400 may be performed by a computing device or system 500, and/or a processing system 502 as described in connection with FIG. 5 below. For instance, the computing device 500 may represent at least a portion of a platform, a server, a system, a device and so forth, in accordance with the present disclosure. For illustrative purposes, the method 400 is described in greater detail below in connection with an example performed by a processing system. The method 400 begins in step 405 and may proceed to step 410.

At step 410, the processing system may receive a request in accordance with a task coordination plan. For example, a third party provider may receive a request for assisting in a transport task involving the use of an autonomous vehicle. In one example, the request may comprise the task coordination plan received from the user that outlines the operational parameters or constraints of the transport task in addition to the series of actions that will be taken to accomplish the transport task.

At step 415, the processing system determines whether the request can be accepted. For example, if the request relates to the transport of a child to the child's home, then the processing system may need to detect the presence of the child at the school location. If the child is at the school location, then the processing system may determine that it is possible to accept the request. However, if the child is not at the school location, then the processing system will determine that it is not possible to accept the request. In another example, if the request relates to the transport of an item to the user's home, then the processing system may need to detect the availability of the item at the third party provider location. If the requested item is at the third party provider location and ready for pick-up, then the processing system will determine that it is possible to accept the request. However, if the requested item is not available at the third party provider location or is not ready for pick-up, then the processing system will determine that it is not possible to accept the request.

In one example, the decision to be made in step 415 is assisted by inputs based upon various sensor data (e.g., presence information of a subject, an image of the subject at the third party location, an entry in a database indicating the presence and/or the readiness of the subject to be transported, etc.) or may be in accordance with one or more automated agents, e.g., a machine learning algorithm (MLA) to detect the presence of a subject at a third party provider location (e.g., a school, a community center, an airport, a bus station, a train station, a field, an arena, a building, and so on), and so forth. In one alternate example, the user may simply inform the network based task management platform 210 that the subject is actually not currently at the third party provider location but the subject will be there at a particular time in the future, e.g., a child is being dropped off at the third party provider location within the hour and the user would like to arrange an autonomous vehicle to transport the child from the third party provider location after the arrival of the child at the third party provider location. In other words, even if the processing system does not detect the current presence of the subject, the processing system may still have the capability to schedule the transport task in the future with the express condition that the transport task can only be consummated if and when the child arrives at the third party provider location. Returning to step 415, if the query is answered negatively at step 415, the method 400 proceeds to step 420, and if the query is answered positively at step 415, the method proceeds to step 425.

At step 420, the processing system will send a rejection responsive to the request. In other words, the requested transport task by the user cannot be fulfilled, e.g., the subject is not at the third party service location (e.g., the requested child is not at the school, the requested subject, e.g., a product, has been sold out and is no longer available, and the like). The method then ends in step 495.

At step 425, the processing system will send an acceptance responsive to the request. In other words, the requested transport task by the user can be fulfilled, e.g., the subject is at the third party service location (e.g., the requested child is at the school, the requested subject, e.g., a product, is still available, and the like). However, in one embodiment the processing system in step 425 may introduce one or more modifications in the task coordination plan as part of the acceptance. For example, the processing system may accept the request to transport the child, but responds with a different time than initially indicated in the task coordination plan. In another example, the processing system may accept the request to transport the products, but responds with a different number of products than initially indicated in the task coordination plan and so on.

At step 430, the processing system executes the start of the task coordination plan. For example, the task coordination plan may contain a sequence of actions to be taken in relation to the use of an autonomous vehicle, e.g., sending the autonomous vehicle to a particular location. For example, the task coordination plan may call for the autonomous vehicle to depart from the user's location and proceeds toward the third party provider location. Alternatively, the task coordination plan may call for the autonomous vehicle to depart from the third party provider's location with the subject already on board and proceeds toward the user location. In other words, in one alternate embodiment, the present method contemplates that it is the third party provider that has a fleet of autonomous vehicles that can be used to implement one or more transport tasks for one or more users.

At step 435, the processing system monitors the execution of the task coordination plan (e.g., a negotiated task coordination plan) for the transport task. Namely, the processing system monitors the steps or actions of the task coordination plan as they are being carried out in accordance with the operational parameters as specified in the task coordination plan for the transport task.

At step 440, the processing system determines whether the steps or actions of the task coordination plan have been completed. If the query is answered negatively at step 440, the method 400 returns to step 435 and continues with the monitoring, and if the query is answered positively at step 440, the method proceeds to step 445.

At step 445, the processing system generates an invoice and/or a report responsive to the completion of the transport task. For example, the invoice may contain the total cost for completing the transport task, e.g., the cost of the subject itself (e.g., for a purchased product), the cost for usage of the autonomous vehicle (e.g., if the autonomous vehicle belongs to the third party provider), and any other incidental costs, e.g., toll charges, fuel charges, tips for the attendants of the third party provider and the like. In another example, the report may contain the above described invoice plus other performance measures, e.g., the timeliness of executing the transport task, problems encountered during the transport task, performance of the attendants of the third party provider, and so on.

At step 450, the processing system provides feedback based on the result of the completion of the request. For example, the data associated with the invoice and report of step 445 can be provided to a machine learning algorithm which will analyze the performance of each transport task to then make future adjustments to improve upon a particular type of transport task. For example, the MLA may learn that the staggering time period selected between different waves of arrival of autonomous vehicles is too short or is too long, or the number of reserved parking spots between manned and unmanned vehicles for different times of the day can be changed to achieve greater efficiency and so on. Method 400 then ends in step 495.

It should be noted that the method 400 may be expanded to include additional steps or may be modified to include additional operations with respect to the steps outlined above. For example, the method 400 may be expanded to include repeating steps 430-450 through multiple iterations for a plurality of transport tasks. Thus, these and other modifications are all contemplated within the scope of the present disclosure.

In addition, it should be noted that although not specifically specified, one or more steps, functions or operations of the method 300 or method 400 may include a storing, displaying and/or outputting step as required for a particular application. In other words, any data, records, fields, and/or intermediate results discussed in the respective methods can be stored, displayed and/or output to another device as required for a particular application. Furthermore, steps or blocks in FIGS. 3 and 4 that recite a determining operation or involve a decision do not necessarily require that both branches of the determining operation be practiced. In other words, one of the branches of the determining operation can be deemed as an optional step. In addition, one or more steps, blocks, functions, or operations of the above described method 300 or method 400 may comprise optional steps, or can be combined, separated, and/or performed in a different order from that described above, without departing from the example embodiments of the present disclosure. However, the use of the term "optional step" is intended to only reflect different variations of a particular illustrative embodiment and is not intended to indicate that steps not labelled as optional steps to be deemed to be essential steps.

Furthermore, the capturing and dissemination of any of the captured video, audio, and/or other task data are only performed in full compliance with the pertinent privacy rules and policies that are in effect at the time. In other words, the captured likenesses, identities, personal information, and so forth of any individuals would only be done with the permission of the individuals (e.g., opting-into a service with full notice of the potential actions of capturing and dissemination of such data) or as permitted by law. In other words, the users of the present disclosure must authorize the usage of the users' task data by the service provider. For example, the present methods can be implemented as a subscribed service where the users are authorizing the processing system to utilize the received user task data and task coordination plan for the benefit of the users. Namely, the subscribed service can be perceived as a network based transport service deployed on an application server within the network and is trained and customized via machine learning for optimizing execution of tasks for users.

FIG. 5 depicts a high-level block diagram of a computing device or processing system specifically programmed to perform the functions described herein. As depicted in FIG. 5, the processing system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for optimizing execution of tasks for users, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 506 may also include antenna elements, transceivers, power units, and so forth. Although only one processor element is shown, it should be noted that the computing device may employ a plurality of processor elements. Furthermore, although only one computing device is shown in the figure, if the method 300 or method 400 as discussed above is implemented in a distributed or parallel manner for a particular illustrative example, i.e., the steps of the above method 300 or method 400, or the entire method 300 or method 400 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300 or method 400. In one example, instructions and data for the present module or process 505 for optimizing execution of tasks for users (e.g., a software program comprising computer-executable instructions) can be loaded into memory 504 and executed by hardware processor element 502 to implement the steps, functions, or operations as discussed above in connection with the illustrative method 300 or method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for optimizing execution of tasks for users (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   detecting, by a processing system comprising at least one processor, a triggering condition for a transport task for transporting an object from a first location to a second location via usage of an autonomous vehicle, wherein the triggering condition is detected in accordance with a task template created by the processing system via a machine learning algorithm that is implemented by the processing system, wherein the machine learning algorithm is trained to detect that the transport task comprises a periodic task, and wherein the machine learning algorithm is trained to learn the triggering condition for the periodic task, wherein the triggering condition is detected from at least one task data set, wherein the at least one task data set comprises at least a biometric data set, wherein the processing system monitors for a plurality of triggering conditions for a plurality of transport tasks including the transport task;
establishing, by the processing system, a negotiated task coordination plan between the processing system and a device of a third party provider for performing the transport task, in response to the detecting the triggering condition for the transport task, wherein the third party provider is a vendor of the object, wherein the establishing the negotiated task coordination plan comprises:
generating a task coordination plan on behalf of a user;
forwarding the task coordination plan to the device of the third party provider;
receiving the negotiated task coordination plan from the device of the third party provider, wherein the negotiated task coordination plan comprises the task coordination plan with at least one modification; and
accepting the negotiated task coordination plan on behalf of the user; and
executing, by the processing system, the negotiated task coordination plan, wherein the executing comprises transmitting a control signal to the autonomous vehicle to travel between the first location and the second location for transporting the object, wherein the autonomous vehicle is to obtain the object at one of: the first location or the second location.

2. The method of claim 1, further comprising:
receiving, by the processing system, feedback from the user.

3. The method of claim 1, further comprising:
receiving, by the processing system, feedback from the third party provider.

4. The method of claim 1, wherein the autonomous vehicle comprises an autonomous motor vehicle, an autonomous ship, or an autonomous drone.

5. The method of claim 1, wherein the processing system is granted a consent by the user to access task data for establishing the negotiated task coordination plan.

6. The method of claim 5, wherein the processing system is further granted a consent by the user to store the task data to be accessible by the third party provider.

7. The method of claim 1, further comprising:
creating the task template for the plurality of transport tasks with the plurality of triggering conditions, wherein the transport task is one of the plurality of transport tasks and the triggering condition is one of the plurality of triggering conditions.

8. A non-transitory computer-readable medium storing instructions which, when executed by a processing system including at least one processor, cause the processing system to perform operations, the operations comprising:
detecting a triggering condition for a transport task for transporting an object from a first location to a second location via usage of an autonomous vehicle, wherein the triggering condition is detected in accordance with a task template created by the processing system via a machine learning algorithm that is implemented by the processing system, wherein the machine learning algorithm is trained to detect that the transport task comprises a periodic task, and wherein the machine learning algorithm is trained to learn the triggering condition for the periodic task, wherein the triggering condition is detected from at least one task data set, wherein the at least one task data set comprises at least a biometric data set, wherein the processing system monitors for a plurality of triggering conditions for a plurality of transport tasks including the transport task;
establishing a negotiated task coordination plan between the processing system and a device of a third party provider for performing the transport task, in response to the detecting the triggering condition for the transport task, wherein the third party provider is a vendor of the object, wherein the establishing the negotiated task coordination plan comprises:
generating a task coordination plan on behalf of a user;
forwarding the task coordination plan to the device of the third party provider;
receiving the negotiated task coordination plan from the device of the third party provider, wherein the negotiated task coordination plan comprises the task coordination plan with at least one modification; and
accepting the negotiated task coordination plan on behalf of the user; and
executing the negotiated task coordination plan, wherein the executing comprises transmitting a control signal to the autonomous vehicle to travel between the first location and the second location for transporting the object, wherein the autonomous vehicle is to obtain the object at one of: the first location or the second location.

9. The non-transitory computer-readable medium of claim 8, the operations further comprising:
receiving feedback from the user.

10. The non-transitory computer-readable medium of claim 8, the operations further comprising:
receiving feedback from the third party provider.

11. The non-transitory computer-readable medium of claim 8, wherein the autonomous vehicle comprises an autonomous motor vehicle, an autonomous ship, or an autonomous drone.

12. The non-transitory computer-readable medium of claim 8, wherein the processing system is granted a consent by the user to access task data for establishing the negotiated task coordination plan.

13. The non-transitory computer-readable medium of claim 12, wherein the processing system is further granted a consent by the user to store the task data to be accessible by the third party provider.

14. The non-transitory computer-readable medium of claim 8, the operations further comprising:
creating the task template for the plurality of transport tasks with the plurality of triggering conditions, wherein the transport task is one of the plurality of transport tasks and the triggering condition is one of the plurality of triggering conditions.

15. A device comprising:
a processing system including at least one processor; and
a computer-readable medium storing instructions which, when executed by the processing system, cause the processing system to perform operations, the operations comprising:
detecting a triggering condition for a transport task for transporting an object from a first location to a second location via usage of an autonomous vehicle, wherein the triggering condition is detected in accordance with a task template created by the processing system via a machine learning algorithm that is implemented by the processing system, wherein the machine learning algorithm is trained to detect that the transport task comprises a periodic task, and wherein the machine learning algorithm is trained to learn the triggering condition for the periodic task, wherein the triggering condition is detected from at least one task data set, wherein the at least one task data set comprises at least a biometric data set, wherein the processing system monitors for a plurality of triggering conditions for a plurality of transport tasks including the transport task;

establishing a negotiated task coordination plan between the processing system and a device of a third party provider for performing the transport task, in response to the detecting the triggering condition for the transport task, wherein the third party provider is a vendor of the object, wherein the establishing the negotiated task coordination plan comprises:

generating a task coordination plan on behalf of a user;

forwarding the task coordination plan to the device of the third party provider;

receiving the negotiated task coordination plan from the device of the third party provider, wherein the negotiated task coordination plan comprises the task coordination plan with at least one modification; and accepting the negotiated task coordination plan on behalf of the user; and executing the negotiated task coordination plan, wherein the executing comprises transmitting a control signal to the autonomous vehicle to travel between the first location and the second location for transporting the object, wherein the autonomous vehicle is to obtain the object at one of: the first location or the second location.

16. The device of claim 15, wherein the operations further comprise:

receiving feedback from the user.

17. The device of claim 15, wherein the operations further comprise:

receiving feedback from the third party provider.

18. The device of claim 15, wherein the autonomous vehicle comprises an autonomous motor vehicle, an autonomous ship, or an autonomous drone.

19. The device of claim 15, wherein the processing system is granted a consent by the user to access task data for establishing the negotiated task coordination plan.

20. The device of claim 19, wherein the processing system is further granted a consent by the user to store the task data to be accessible by the third party provider.

* * * * *